United States Patent
Ikehata et al.

(10) Patent No.: US 7,098,948 B2
(45) Date of Patent: Aug. 29, 2006

(54) DIGITAL CAMERA ACCOMMODATING DIFFERENT PORTABLE RECORDING MEDIA AND CONTROL METHOD THEREOF

(75) Inventors: Tatsuhiko Ikehata, Fukaya (JP); Shiro Nagaoka, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 754 days.

(21) Appl. No.: 09/948,703

(22) Filed: Sep. 10, 2001

(65) Prior Publication Data

US 2004/0201746 A1  Oct. 14, 2004

(30) Foreign Application Priority Data

Apr. 26, 2001 (JP) ............... 2001-130080

(51) Int. Cl.
*H04N 5/76* (2006.01)
(52) U.S. Cl. .................................. 348/231.8
(58) Field of Classification Search ........... 348/231.99, 348/231.1, 231.2, 231.3, 231.5, 231.6, 231.7, 348/231.8, 231.9, 207.99, 207.1, 211.1, 211.99
See application file for complete search history.

(56) References Cited

U.S. PATENT DOCUMENTS

| | | | | |
|---|---|---|---|---|
| 5,153,730 A | * | 10/1992 | Nagasaki et al. | 348/231.6 |
| 5,563,655 A | * | 10/1996 | Lathrop | 348/231.9 |
| 5,805,214 A | * | 9/1998 | Nishizawa et al. | 348/231.8 |
| 5,986,700 A | * | 11/1999 | Wakui | 348/231.8 |
| 6,630,954 B1 | * | 10/2003 | Okada | 348/231.7 |
| 6,650,437 B1 | * | 11/2003 | Nakajima | 358/1.9 |
| 6,661,454 B1 | * | 12/2003 | Hwang et al. | 348/231.1 |
| 6,668,134 B1 | * | 12/2003 | Niikawa | 386/95 |
| 6,727,944 B1 | * | 4/2004 | Adachi | 348/231.99 |

FOREIGN PATENT DOCUMENTS

| | | |
|---|---|---|
| JP | 5-91452 | 4/1993 |
| JP | 10-233989 | 9/1998 |

* cited by examiner

*Primary Examiner*—David Ometz
*Assistant Examiner*—Nelson D. Hernandez
(74) *Attorney, Agent, or Firm*—Pillsbury Winthrop Shaw Pittman, LLP (57) ABSTRACT

A digital camera which converts a picked-up optical image of an object into digital image data comprises a memory card slot part and a disk drive part. Digital image data can be transferred between a memory attached to the memory card slot part and a small disk inserted into the disk drive part.

7 Claims, 5 Drawing Sheets

DIGITAL CAMERA ACCOMMODATING DIFFERENT PORTABLE RECORDING MEDIA AND CONTROL METHOD THEREOF

CROSS-REFERENCE TO RELATED APPLICATIONS

This application is based upon and claims the benefit of priority from the prior Japanese Patent Application No. 2001-130080, filed Apr. 26, 2001, the entire contents of which are incorporated herein by reference.

BACKGROUND OF THE INVENTION

1. Field of the Invention

The present invention relates to a digital camera and a control method thereof in which a still image or a motion picture of a picked-up object is converted into digital image data and recorded on a portable recording medium attached to a main body.

2. Description of the Related Art

As is well known, a conventional digital camera as described above is constructed such that a memory card including, for example, a semiconductor memory and the like is attached to a memory card slot part provided in the main body of the camera to record digital image data.

Meanwhile, in recent years, for example, developments have been made in the technique of recording/reproducing digital data on/from a small disk having a diameter of about 1 inch, which has a portability substantially equivalent to a memory card, by means of magnetism, light, magneto-optics, or the like.

Therefore, in a digital camera, a disk drive part for driving a small disk is mounted on its main body, so that digital image data can be recorded on a small disk.

However, the digital camera as described above is still being developed. It has been strongly required that improvements should be made in various areas so as to comply sufficiently with the needs of users.

Two types of digital cameras are known. The first type uses a memory card as portable recording medium. The second type uses a small disk as portable recording medium.

Data cannot be transferred from the camera of the first type, directly to the camera of the second type. Nor can data be transferred to the camera of the second type, directly to the camera of the first type.

Therefore, in the case of performing a simple edit operation or the like for transferring digital image data between a memory card and a small disk, it is necessary to use an optional editing system using a PC (Personal Computer).

That is, by using this editing system, it is possible to carry out the operation of reading the necessary data from one recording medium, storing it, and writing the stored data into another recording medium.

However, if even simple editing cannot be carried out unless an optional editing system is used, it will be inconvenient for a user. A problem hence arises in that the camera is not suitable for practical use.

Note that known techniques concerning an electronic camera for recording image data obtained by picking up an image onto a recording medium are disclosed in, for example, Japanese Patent Application KOKAI Publication No. 5-91452 and Japanese Patent Application KOKAI Publication No. 10-233989.

However, the former reference discloses a technique in which image data obtained by picking up an image is stored into either an internal memory or an external memory in accordance with a selection made by a memory selection switch.

Meanwhile, the latter reference discloses a technique in which still image data and moving picture data are respectively stored in dedicated memories. Thus, neither of the references includes a description concerning countermeasures against problems as described above.

BRIEF SUMMARY OF THE INVENTION

The present invention has been made in consideration of the above situation and has an object of providing a digital camera and a method of controlling the same, in which both different types of portable recording media can be attached and data can be transferred between the portable recording media, so that simple editing can be realized and handling for users is convenient and suitable for practical use.

A digital camera according to the present invention converts a picked-up optical image of an object into digital image data. The camera comprises first and second attachments to which first and second recording media of types different from each other can be attached, and a controller recording/reproducing the digital image data onto/from the first and second recording media attached to the first and second attachments.

A method according to the present invention is to control a digital camera which converts an image of an object into digital data. The method comprises an attachment step of attaching first and second attachments to which first and second recording media of types different from each other can be attached, and a control step of recording/reproducing the digital image data onto/from the first and second recording media attached to the first and second attachments in the attach.

According to the structure and method as described above, digital image data is recorded/reproduced onto/from the first and second recording media attached respectively to the first and second attachments. Therefore, simple editing can easily be realized without using optional editing systems or so like the prior art, so handling for users is convenient and suitable for practical use.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
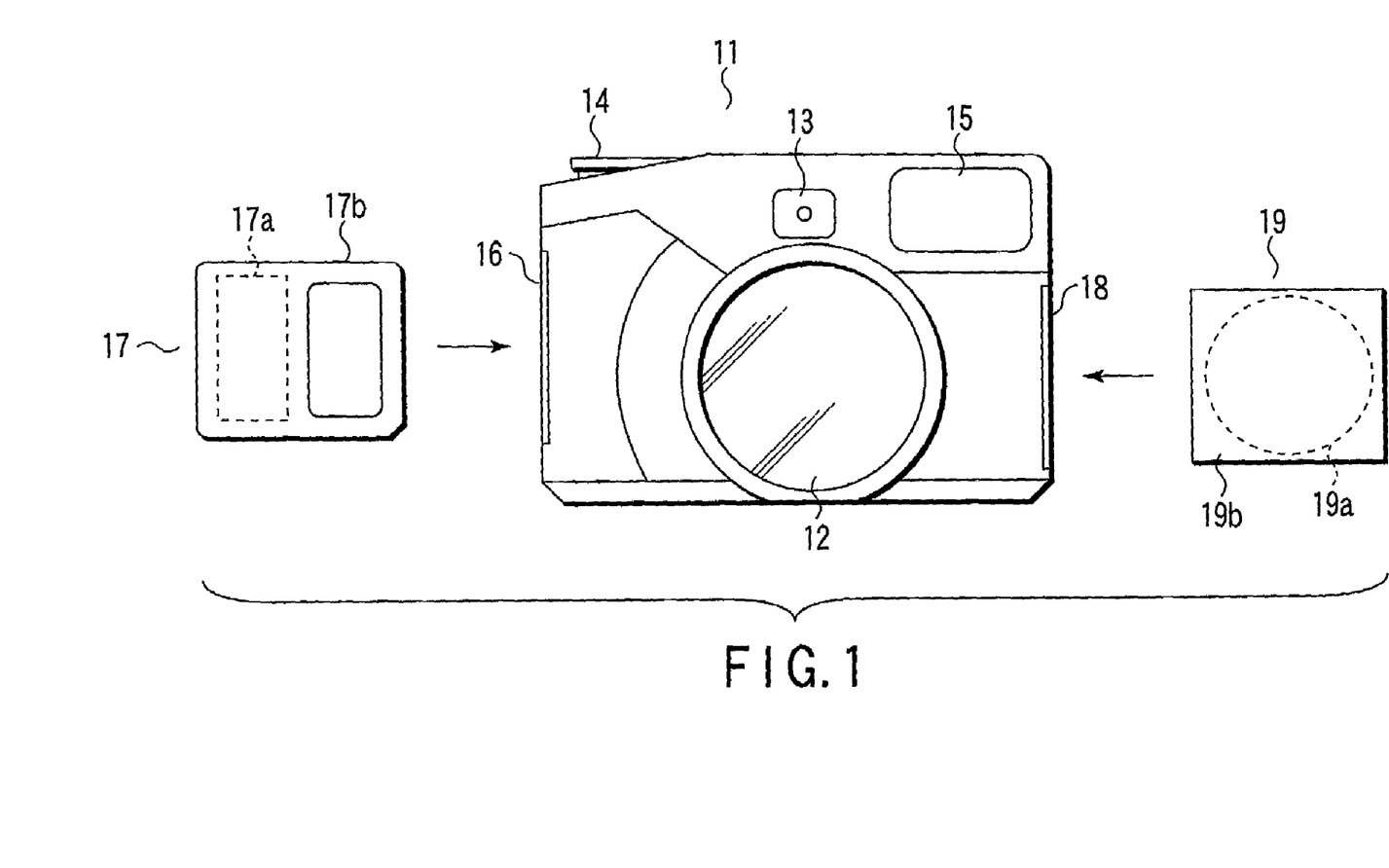
FIG. 1 is a front view showing an embodiment of the present invention and illustrates an outer appearance of a digital still camera.

In the following, an embodiment of the present invention will be explained with reference to the drawings. FIG. 1 shows an outer appearance of a digital still camera 11, viewed from the front side of the camera.

Specifically, an image pick-up lens 12, a finder 13, a release switch 14, a strobe 15, and the like are provided respectively at predetermined positions in the digital still camera 11.

Also, a memory card slot 16 is provided at a side surface thereof in the digital still camera 11. A memory card 17 is inserted into the memory card slot 16.

In this memory card 17, for example, a memory 17a constructed by a semiconductor memory chip made in the form of an IC (Integrated Circuit), a ferroelectric memory chip, or the like are contained in a card-like case 17b.

Further, this digital still camera 11 is capable of recording/reproducing digital image data obtained by picking up an image, onto/from the memory 17a of the memory card 17 inserted into the memory card slot 16.

Further, a disk drive part 18 is provided at the other side surface of this digital still camera 11. A disk cartridge 19 having a size substantially equal to the memory card 17 is attached to the disk drive part 18.

In the disk cartridge 19, a small disk 19a capable of recording/reproducing digital data by magnetism, light, or magneto-optics is contained in a casing 19b.

Further, the digital still camera 11 is capable of recording/reproducing digital image data obtained by picking up an image onto/from the small disk 19a in the disk cartridge 19.

Also, the digital still camera 11 is capable of performing control for reading digital image data from the memory 17a and writing it into the small disk 19, control for reading digital image data from the small disk 19a and writing it into the memory 17a, or the like.

Figure 2:
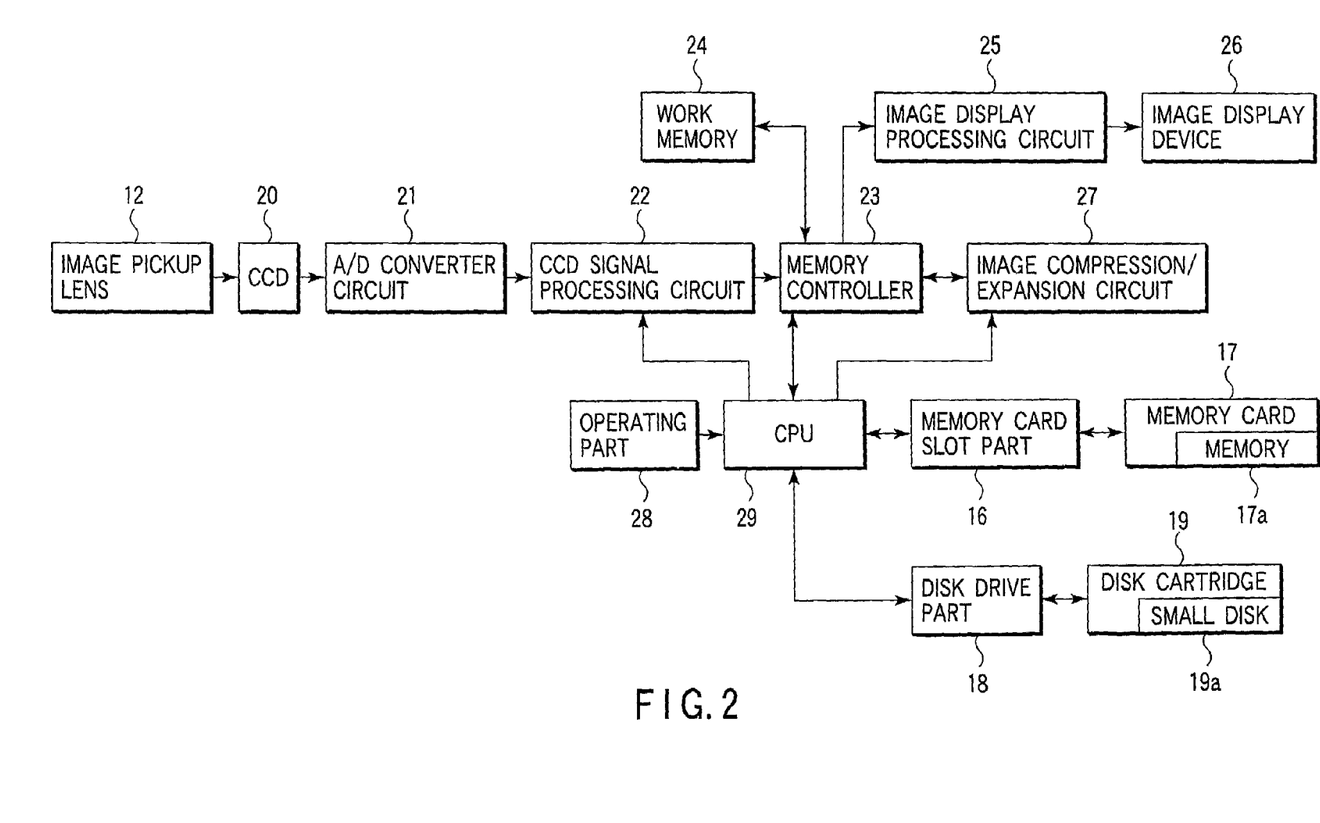
FIG. 2 is a block configuration diagram showing a signal processing system of a digital still camera in the embodiment.

FIG. 2 shows a signal processing system in the digital still camera 11. That is, an optical image of an object which is inserted through the image pickup lens 12 is focused on a CCD (Charge Coupled Device) 20 and is photoelectrically converted.

Further, the analogue image signal outputted from the CCD 20 is supplied to the A/D (Analogue/Digital) convertor 21 and converted into digital data. The digital image data is thereafter supplied to a CCD signal processing circuit 22.

This CCD signal processing circuit 22 performs predetermined signal processing on inputted digital image data, thereby to convert the digital image data into a luminance signal component and a chrominance signal component.

Further, digital image data including the luminance signal and chrominance signal obtained by the CCD signal processing circuit 22 is written into a work memory 24 through a memory controller 23.

The digital image data recorded in the work memory 24 is read out onto an image display processing circuit 25 through the memory controller 23, and predetermined processing for displaying an image is performed thereon, so that the data is converted into an analogue image signal.

Thereafter, the analogue image signal outputted from the image display processing circuit 25 is supplied to an image display device 26 externally attached to the digital still camera 11 and displayed as an image.

Also, the digital image data outputted from the CCD signal processing circuit 22 may be guided to an image compression/expansion processing circuit 27 through the memory controller 23 and may be subjected to predetermined compression processing.

Further, the digital image data subjected to compression processing by the image compression/expansion processing circuit 27 can be written into the work memory 24.

In this case, the digital image data recorded on the work memory 24 is fed to the image compression/expansion processing circuit 27, and predetermined expansion processing is performed, so that the data is converted into original digital image data.

The digital image data thus subjected to expansion processing by the image compression/expansion processing circuit 27 may be guided to the image display device 26 and may be displayed as an image through the image display processing circuit 25.

A series of processing operations as described above are unitarily controlled by a CPU (Central Processing Unit) 29 which operates in response to operation information from an operating part 28 including the release switch 14.

The operation of recording/reproducing digital image data onto/from the memory 17a of the memory card 17 and the small disk 19a of the disk cartridge 19 is also unitarily controlled by the CPU 29.

That is, the digital image data output from the CCD signal processing circuit 22 is supplied via the memory controller 23 to the image compression/expansion processing circuit 27. The circuit 27 compresses the digital image data.

The digital image data thus subjected to compression processing is once recorded into the work memory 24 through the memory controller 23. Thereafter, the digital image data read out from the work memory 24 is guided to the memory card slot 16 through the memory controller 23 and the CPU 29 and is recorded into the memory 17a of the memory card 17.

The digital image data recorded in the memory 17a of the memory card 17 is read out from the memory card slot part 16 by the memory card slot part 16 and is once recorded into the work memory 24 after passing through the CPU 29 and the memory controller 23.

Thereafter, the digital image data read out from the work memory 24 is introduced to the image compression/expansion circuit 27 and subjected to expansion processing, so that the data is converted back into original digital image data.

Further, the digital image data on which expansion processing is performed by the image compression/expansion processing circuit 27 is fed to the image display device 26 through the memory controller 23 and the image display processing circuit 25, and is displayed as an image.

Also, the digital image data, which has been outputted from the CCD signal processing circuit 22 and subjected to compression processing by the image compression/expansion processing circuit 27 through the memory controller 23, is once recorded into the work memory 24 through the memory controller 23.

Thereafter, the digital image data read out from the work memory 24 is fed to the disk drive part 18 through the main controller 23 and the CPU 29, and is recorded onto the small disk 19a of the disk cartridge 19.

The digital image data recorded on the small disk 19a of the disk cartridge 19 is read out by the disk drive part 18 and is once recorded into the work memory 24, after passing through the CPU 29 and the memory controller 23.

Thereafter, the digital image data read out from the work memory 24 is guided to the image compression/expansion processing circuit 27, and expansion processing is performed thereon, so the data is converted back into the original digital image data.

Further, the digital image data on which expansion processing is performed by the image compression/expansion processing circuit 27 is guided to the image display device 26 through the memory controller 23 and the image display processing circuit 25, to display an image.

Figure 3:
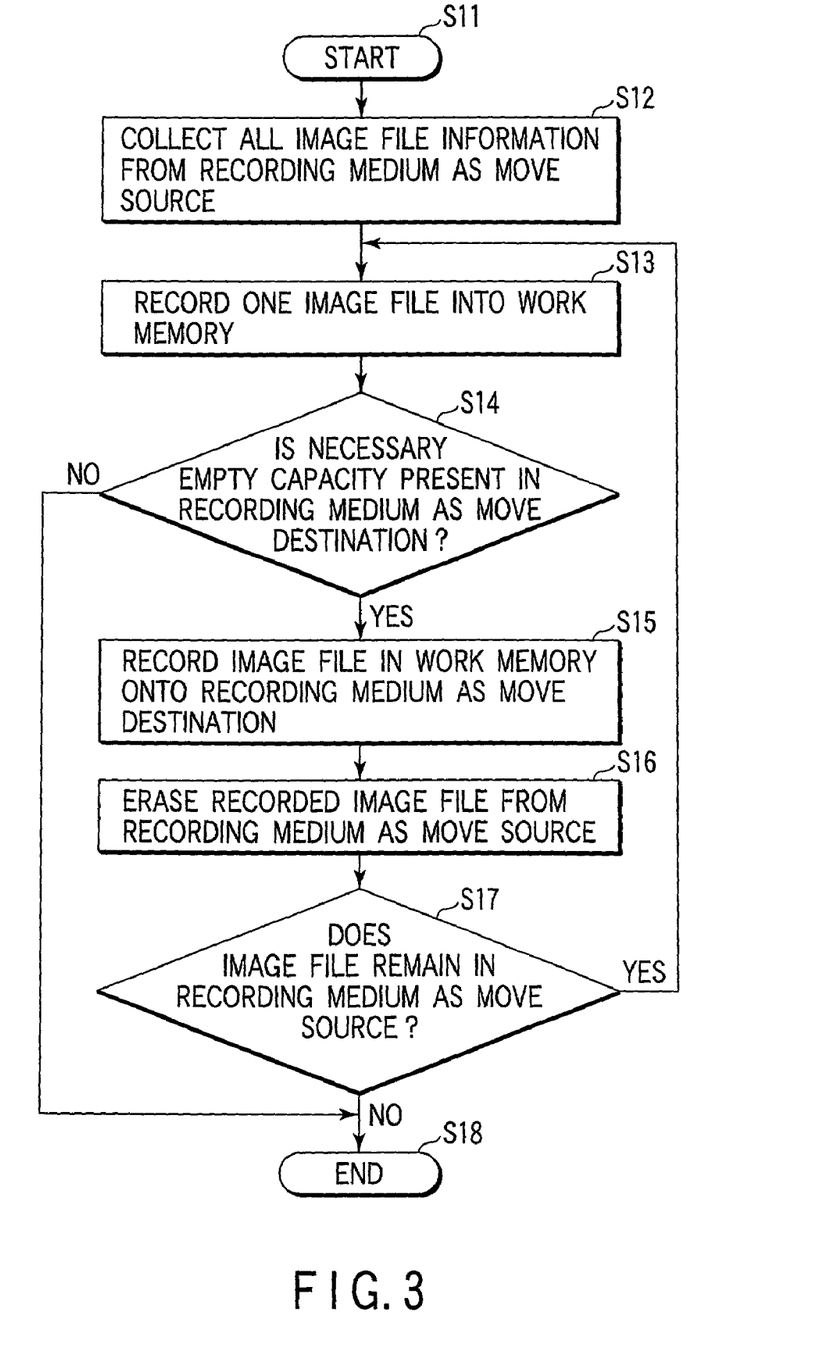
FIG. 3 is a flowchart for explaining an editing operation for moving digital image data in the embodiment.

Next, FIG. 3 shows a flowchart showing an example of editing operation for moving digital image data recorded on one of two types of recording media, which are the memory 17a and the small disk 19a, to the other one of the recording media.

From the flowchart shown in FIG. 3, compression processing and expansion processing which are performed on digital image data are omitted to simplify the understanding of its main operation.

Firstly, upon starting the operation (step S11), the CPU 29 collects image files (information) corresponding to all of the digital image data recorded on the recording medium as a move source from which data is to be moved in the step S12.

Further, in the step S13, the CPU 29 reads one image file among all image files (information) collected from the recording medium as the move source, and records it into the work memory 24.

Thereafter, in the step S14, the CPU 29 determines whether or not the space necessary for writing data to be recorded exists in the recording medium as a move destination. If it is determined that no space exists (NO), the operation ends as it is (step S18).

Otherwise, if it is determined in the step S14 that space exists in the recording medium as the move destination (YES), the CPU 29 performs control so as to read the image file recorded in the work memory 24 and to write it onto the recording medium as the move destination in the step S15.

Thereafter, in the step S16, the CPU 29 erases the image file which has been completely recorded onto the recording medium as the move destination. In the step S17, the CPU 29 determines whether or not an image file remains on the recording medium as the move source.

If it is determined that an image file remains (YES), the CPU 29 returns to the processing of the step S13. If it is determined that no image file remains (NO), the processing is directly ended (in the step S18).

According to the structure and operation example as described above, both of the memory card 16 and the disk cartridge 19 can be attached to the digital still camera 11. It is therefore possible to realize automatically the editing operation of moving all image files recorded on one of the recording media to the other. Handling is thus convenient for users and is suitable for practical use.

Figure 4:
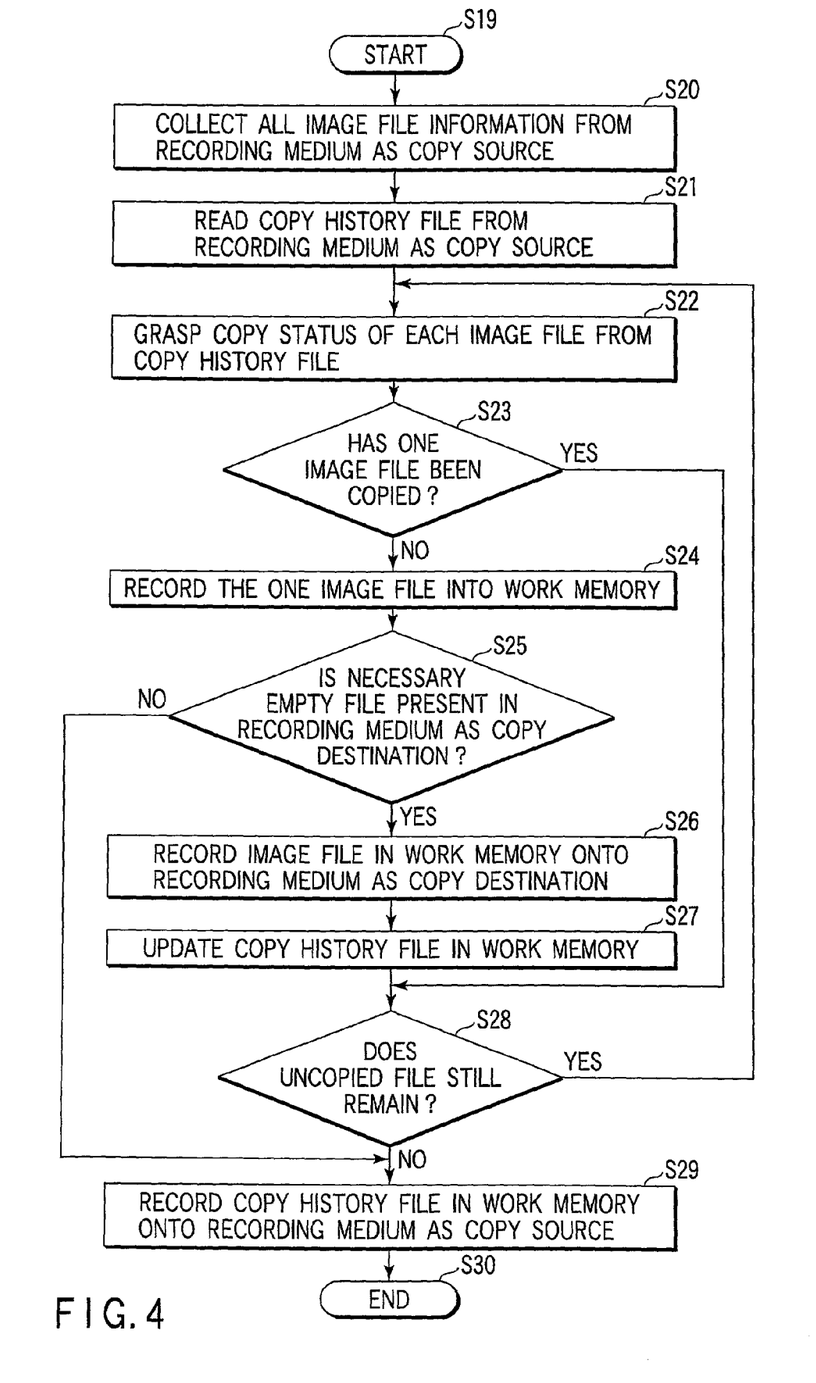
FIG. 4 is a flowchart for explaining an editing operation for moving digital image data in the embodiment.

Next, FIG. 4 shows a flowchart showing an example of explaining an editing operation for copying image data recorded on one of two types of recording media, i.e., the memory 17a and the small disk 19a, to the other one of the recording media.

From the flowchart shown in FIG. 4, compression processing and expansion processing made on digital image data are also omitted to simplify the understanding of its main operation.

At first, upon starting (step S19), the CPU 29 collects image files (information) corresponding to all of the digital image data in the step S20.

Also, in the step S21, the CPU 29 reads a copy history (information) from the recording medium as a copy source and records it into the work memory 24. This copy history file is information indicating presence or absence of a past copy operation with respect to each image file recorded on the recording medium if the copy source has been copied in the past.

Further, in the step S22, the CPU 29 grasps the copy status of each image file recorded on the recording medium as the copy source, based on the copy history file recorded in the work memory 24.

Thereafter, in the step S23, the CPU 29 determines whether or not copying has been completed with respect to an image file recorded on the recording medium as the copy source. If it is determined that copying has not been completed yet (NO), the CPU 29 reads the one image file from the recording medium as the copy source and records it into the work memory 24 in the step S24.

In the step S25, the CPU 29 determines whether or not space necessary for writing data to be recorded exists in the recording medium as the copy destination to which data is copied.

If it is determined that space exists on the recording medium as the copy destination (YES), the CPU 29 makes control so as to read the image file recorded in the work memory 24, and write it into the recording medium as the copy destination, in the step S26.

Thereafter, in the step S27, the CPU 29 adds information indicating that the image file has been copied, to the copy history file recorded in the work memory 24. That is, the CPU 29 updates the copy history file in the work memory 24.

Further, after the step S27 or if it is determined in the step S23 that the one image file recorded on the recording medium as the copy source has been copied (YES), the CPU 29 determines whether an image file which has not yet been copied remains in the recording medium as the copy source, in the step S28. If it is determined that an image file remains (YES), the processing is returned to the step S22.

If it is determined in the step S28 that an image file which has not yet been copied does not remain any more in the recording medium as the copy source (NO), or if it is determined in the step S25 that the necessary space does not exist in the recording medium as the copy destination (NO), the CPU 29 writes the copy history file of the work memory 24 onto the recording medium as the copy source, in the step S29, and then, ends the processing (step S30).

According to the operation example as described above, it is possible to realize automatically the editing operation of selecting an image file which has not been copied in the past from image files recorded on one of the recording media and of copying it into the other one of the recording media. Handling is thus convenient for users and is suitable for practical use.

Figure 5:
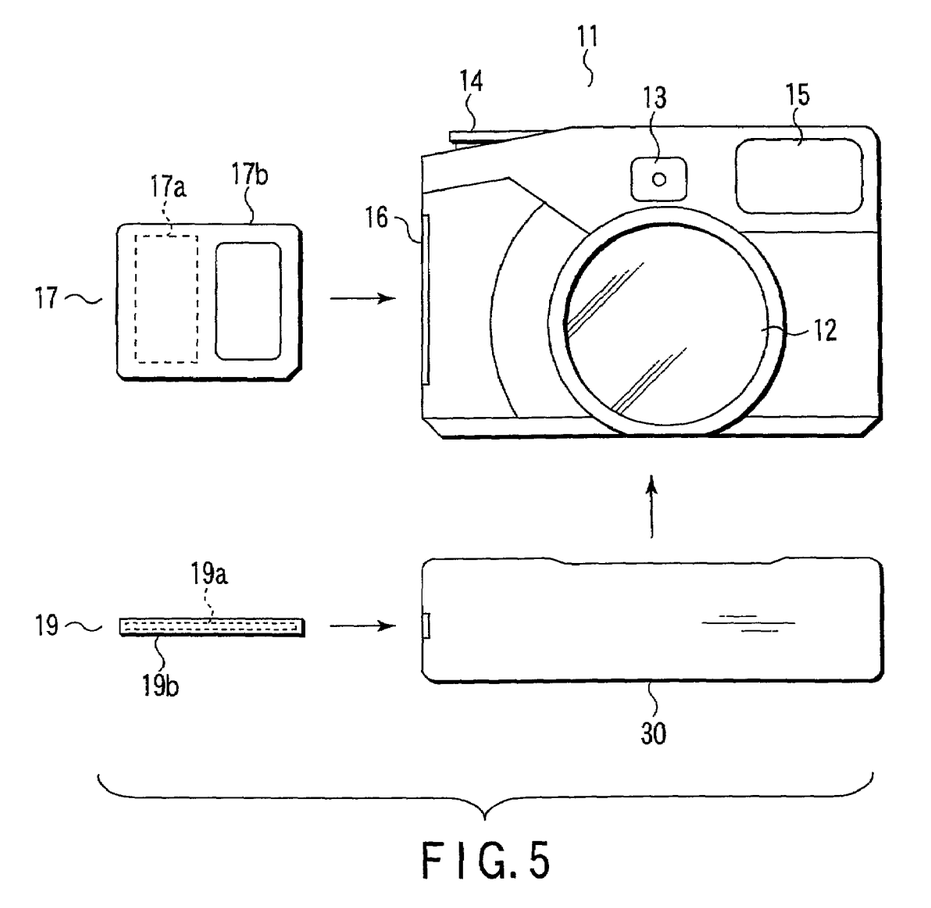
FIG. 5 is a front view showing an outer appearance of a digital still camera to explain a modification example of the embodiment.

Next, FIG. 5 shows a modification example of the embodiment described above. An explanation will now be made with the same parts as those of FIG. 1 denoted by the same reference symbols. A separate display drive part 30 is provided for a digital still camera 11.

Specifically, the disk drive part 30 is provided to be detachable/attachable from/to the digital still camera 11. Its size is arranged such that portability of the digital still camera 11 might not be hindered even in a state where the drive part is attached to the camera.

Further, the disk cartridge 19 as described previously can be attached to the disk drive part 30, and digital image data obtained by picking up an image by the digital still camera 11 can be recorded/reproduced onto/from the small disk 19a of the disk cartridge 19.

Even in this structure in which the digital still camera 11 and the disk drive part 30 are constructed separately from each other, it is possible to perform control for reading digital image data from the memory 17a and writing it onto the small disk 19a, and conversely, control for reading digital image data from the small disk 19a and writing it into the memory 17a, on the contrary, and the like. The edit operations as shown in FIGS. 3 and 4 can thus be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera comprising:
an image pickup lens;
a finder;
a strobe;
a release switch;
a processing section, which converts an optical image of an object inserted through the image pickup lens into digital image data;
a first mounting section, which mounts a memory card;
a second mounting section, which mounts a disk drive unit provided with a disk recording medium, and
a control section configured to control reading of the digital image data from the memory card and have it recorded by the disk recording medium, and to control reading of the digital image data from the disk recording medium and have it recorded by the memory card,
wherein, the control section (a) sets a restriction on the digital image data read from the memory card and recorded into the disk recording medium, based on history information concerning copying of the digital image data, which is recorded on the memory card, (b) sets a restriction on such digital image data of digital image data recorded on the memory card that is determined as not having been copied, from the history information, such that the digital image data might not be recorded onto the disk recording media, (c) sets a restriction on the digital image data read from the disk recording medium and recorded into the memory card, based on the history information concerning copying of the digital image data of digital image data recorded on the disk recording media, and (d) sets a restriction on the digital image data of the digital image data recorded on the disk recording media that is determined as not having been copied, from the history information, such that the digital image data might not be recorded onto the memory card.

2. A digital camera according to claim 1, wherein:
the control section updates history information of the memory card in a state in which such digital image data recorded on the recording media that is determined as not having been copied, from the history information, and
the control section updates history information of the disk recording medium in a state in which such digital image data recorded on one of the memory card that is determined as not having been copied, from the history information.

3. A method of controlling a digital camera containing an image pickup lens, release switch, and a strobe, said method comprising:

(a) converting an optical image of an object inserted through the image pickup lens into digital image data;
(b) mounting a memory card; and
(c) performing an operation of recording and reproducing the digital image data with respect to the mounted memory card and a disk recording medium, the recording and operation including:
 (i) reading the digital image data recorded in the memory card to record the digital data in the disk recording medium, and
 (ii) reading the digital image data recorded in the disk recording medium to have it recorded into the memory card,
wherein the recording and reproducing operation (1) seats a restriction on the digital image data read from the memory card and recorded into the disk recording medium, based on history information concerning copying of the digital image data, which is recorded on the memory card, (2) sets a restriction on such digital image data of digital image data recorded on the memory card that is determined as not having been copied, from the history information, such that the digital image data might not be recorded onto the disk recording media, (3) sets a restriction on the digital image data read from the disk recording medium and recorded into the memory card, based on the history information concerning copying of the digital image data, which is recorded on the disk recording media, and (4) sets a restriction on such digital image data of digital image data recorded on the recording media that is determined as not having been copied, from the history information, such that the digital image data might not be recorded onto the memory card.

4. A method of controlling a digital camera according to claim 3, wherein:
the recording and reproducing operation updates history information of the memory card in a state in which such digital image data recorded on the recording media that is determined as not having been copied, from the history information, and
the recording and reproducing operation updates history information of the disk recording medium in a state in which such digital image data recorded on one of the memory card that is determined as not having been copied, from the history information.

5. A digital camera, comprising:
an image pickup lens; a finder;
a release switch;
a strobe;
processing means for converting an optical image of an object inserted through the image pickup lens;
a first mounting means for mounting a memory card;
a second mounting means for mounting a disk drive unit provided with a disk recording medium; and
a control means for controlling reading of the digital image data read from the memory card and have it recorded by the disk recording medium, and for controlling reading of the digital image data from the disk recording medium and have it recorded by the memory card,
wherein the control means (i) sets a restriction on the digital image data read from the memory card and recorded into the disk recording medium, based on history information concerning copying of the digital image data, which is recorded on the memory card, and (ii) sets a restriction on such digital image data of digital image data recorded on the memory card that is determined as not having been copied, from the history information, such that the digital image data might not be recorded onto the disk recording media, (iii) sets a restriction on the digital image data read from the disk recording medium and recorded into the memory card, based on the history information concerning copying of the digital image data, which is recorded on the disk recording media and (iv) sets a restriction on such digital image data of digital image data recorded on the recording media that is determined as not having been copied, from the history information, such that the digital image data might not be recorded onto the memory card.

6. A digital camera according to claim 5, wherein:

the control means updates history information of the memory card in a state in which such digital image data recorded on the recording media that is determined as not having been copied, from the history information, and the control means updates history information of the disk recording medium in a state in which such digital image data recorded on one of the memory cards tat is determined as not having been copied, from the history information.

7. The digital camera according to claim 5, wherein a state in which such digital image data of digital image data recorded on one of the recording media that is determined as not having been copied, from the history information, is recorded on the other recording media, the control means updates the history information on the one of the recording media.

\* \* \* \* \*